United States Patent [19]
Evers

[11] Patent Number: 4,830,835
[45] Date of Patent: May 16, 1989

[54] TUBULAR MIXER-SETTLER FOR LIQUID-LIQUID COUNTERCURRENT EXTRACTION

[75] Inventor: Heinz Evers, Busenberg, Fed. Rep. of Germany

[73] Assignee: Wiederaufarbeitungsanlage Karlsruhe Betriebsgesellschaft mbH, Eggenstein-Leopoldshafen, Fed. Rep. of Germany

[21] Appl. No.: 44,790

[22] Filed: May 1, 1987

[30] Foreign Application Priority Data

May 3, 1986 [DE] Fed. Rep. of Germany ....... 3615137

[51] Int. Cl.$^4$ ............................................. B01D 11/04
[52] U.S. Cl. .................................. 422/259; 210/634; 210/511
[58] Field of Search ................ 422/259; 210/634, 511, 210/522

[56] References Cited

U.S. PATENT DOCUMENTS 3,089,756  5/1963  Tanner ................................. 422/259

OTHER PUBLICATIONS

Davis, Jr. et al., "Mixer-Settler Extraction Equipment", from CEP, 4-1954, pp. 188-197.

*Primary Examiner*—Frank Spear
*Attorney, Agent, or Firm*—Walter Ottesen

[57] ABSTRACT

A multi-stage tubular mixer-settler for use in liquid-liquid countercurrent extraction includes lengths of tubing disposed in a horizontal plane parallel with and spaced alongside and apart from one another. The lengths of tube each include a settling chamber. The mixing chambers associated with the settling chambers are in each length of tube and are provided with a rotary agitator disposed vertically in the mixing chamber. In order to require a smaller quantity of washing phase flow during extraction and to achieve a high throughput for satisfactory hydraulic conditions in the extractor, each mixing chamber is likewise configured as a horizontal portion of tube fitted flush with the settling chamber. The feeds of the two phases to be blended discharge into the free end face of each mixing chamber. Mixing and settling chambers are in each length of tube and are isolated from each other by a vertical partition wall provided with an aperture in the region of the interface between the phases. A conduit connects the mixing chamber to the settling chamber so that one phase can be fed back from the settling chamber to the mixing chamber. The mixing agitator effects the return by drawing the phase which is to be recycled through the conduit.

3 Claims, 4 Drawing Sheets

TUBULAR MIXER-SETTLER FOR LIQUID-LIQUID COUNTERCURRENT EXTRACTION

FIELD OF THE INVENTION

The invention relates to a multi-stage tubular mixer-settler for use in liquid-liquid countercurrent extraction which includes mutually parallel tubular lengths spaced apart and disposed in a horizontal plane one next to the other. Each tube length includes a settler and a rotary agitator disposed vertically in a mixing chamber.

BACKGROUND OF THE INVENTION

With regard to the reprocessing of irradiated nuclear fuel, the Purex process is usually applied. Further developments of the Purex process lead to a situation wherein organic extraction agents and aqueous phases are increasingly circulated. This intensive recycling of the process media does, however, necessitate effective regeneration steps for both phases. The foregoing is made more difficult by the fact that the purification methods used should result in the least amount of waste possible.

For cleaning the aqueous phase, a kerosene wash is used. The process flows occurring in the Purex process always contain some organic extraction medium in dissolved and finely suspended form. Upon further processing of the aqueous process solutions, the organic extraction medium residues, for example tributyl phosphate (TBP), would become concentrated and cause problems.

During the kerosene wash mentioned above, the aqueous phase comes in contact with an organic thinner (kerosene). The entrained residues of organic extraction medium, by reason of their better solubility in the organic phase, are washed out of the aqueous solution. The extraction medium residues are thus effectively isolated.

From the text "Chemie der nuklearen Entsorgung", Part III, Verlag Karl Thiemig, Munich, Volume 91, page 146, it is known to use mixer-settlers for the kerosene washing process. It has been ascertained that installations with single-stage mixer-settlers ensure only an inadequate TBP separation.

Multi-stage mixer-settlers are box-shaped containers which comprise a plurality of closely adjacent mixing and settling chambers. The aqueous phase and the organic phase are blended in the mixing chamber by agitation. The mixture flows into the settling chamber in which organic and aqueous phases separate following mass transfer. The organic phase flows into an adjacent mixing chamber while the aqueous phase flows into the oppositely adjacent mixing chamber of the next stage. Because of a plurality of serially connected mixer-settler stages, this process is repeated until such time as the desired separating effect has been achieved. The mixer-settler banks have a pumping-mixing agitator in the mixing chamber.

The sluggish way the mixer-settlers operate brings with it the disadvantage of long response times in the case of stationary operating situations. The state of hydrostatic equilibrium in which all chambers are in relation to one another can be disturbed, for example, by changes in concentration or density. Then one of the two phases is displaced from the chambers and the countercurrent is stopped. The known mixer-settlers do not permit a free choice of the continuous phase either, which would be desirable for reasons of mass transfer direction, mass transfer area, phase separation performance, et cetera.

A Pu-bearing phase also occurs as an aqueous process flow which is to be purified. This Pu-containing aqueous process flow ought to be cleansed with kerosene to remove extraction medium residues of tributyl phosphate. Where the known box-like mixer-settlers are concerned, only a small overall height is admissible on grounds of criticality, so that throughput is quite limited. In addition, a clearly defined working pattern is impossible with respect to recycling of the washing phase quantity. The flow of product is therefore only incompletely cleansed of extraction medium residues. Furthermore, with the low overall height which is possible, fluctuations in flow or dispersion build-up as well as deposits of mull in the settling chambers quite frequently lead to hydraulic disturbances.

In order to achieve minimal secondary waste and optimum extraction, an internal and defined recycling of the washing phase is sought. In this way, the supply of external washing phase can be minimized because the washing phase is used more effectively.

Multi-stage mixer-settlers with tubular settling chambers guarantee the required throughput geometrically-critically and do not have to be heterogeneously contaminated by incorporated structures. With a tube diameter of 150 mm, Pu-concentrations of up to 350 g Pu per liter can be handled. If, then, a controlled internal recycling of the washing phase is also achieved, then extraction can be optimally performed. The washing flow, for example kerosene, can be reduced generating a considerably smaller flow of waste.

SUMMARY OF THE INVENTION

It is an object of the invention to provide a tubular mixer-settler which can be used for various process liquids and which has a high throughput. It is a further object of the invention to provide such a tubular mixer-settler having a configuration which permits defined mixing and settling processes with good extraction and a reduced flow of washing phase.

According to a feature of the invention, feed and discharge between the individual extraction stages occur through the end faces of a stage. Criticality safety can easily be attained since close proximity such as occurs with box-like mixer-settlers, is avoided.

The cylindrically configured mixing chambers make it possible for both phases (aqueous and organic) to be fed without any pumping action from the agitator because all extraction stages and their mixing chambers are on one uniform level. There is no need for a phase to be lifted.

Constructed as a length of tubing, the mixing chamber has a spatial form which is advantageous for the mixing process. Flat mixing chambers unfavorable for flow such as are used in box-like mixer-settlers, are avoided.

From the settled washing phase, a clearly defined quantity is drawn from the settling chamber by the suction effect of the agitator and is passed back into the mixing chamber through a conduit extending between the settling chamber and the mixing chamber. The cross section of the recycling conduit, the agitator shape and its placement are so combined that a complete and thorough mixing of the phases occurs over the entire mixing chamber within an ascertained range of rotary speeds. Thus, a previously calculated retention time of the dispersion in the mixing chamber can be achieved which is necessary for satisfactory mass transfer.

The arrangement of the agitator and recycling conduit will also determine the phase position. In this way, the washing phase may be the enclosing (continuous) phase. This has the advantage that the phases are quantitatively separated in the settling chamber and the foreign portion in the out flowing phases is reduced to a minimum.

In order to obtain an adequate proportion between the phase to be cleaned and the cleaning phase in the mixing chamber, the cleaning phase or washing phase feed need no longer be so large because the washing phase from the particular settling chamber is recycled. The outcome is that satisfactory extraction is achieved with a smaller quantity of washing phase. Substantially less secondary waste results from more efficient utilization of the washing phase.

The location of the end of the conduit determines which phase is fed back thereby facilitating adjustment of the phase position in the extractor.

According to another feature of the invention, the extraction stages are interconnected by conduits that are run outside of the settler and are connected via the end faces of the extraction stages. This feature permits a structural adaptation and changes of the spacings between the stages.

The partition wall between the mixing chambers and the settling chamber is provided with an opening at the region of the interface of the phases in the settling chamber. This feature of the invention provides for an improved hydraulic function.

The invention provides a multi-stage mixer-settler which is suitable for all process media while providing a high level of throughput and which minimize secondary waste in the washing phase.

BRIEF DESCRIPTION OF THE DRAWING

The invention will now be described with reference to the drawing wherein.

DESCRIPTION OF THE PREFERRED EMBODIMENTS OF THE INVENTION

Figure 1:
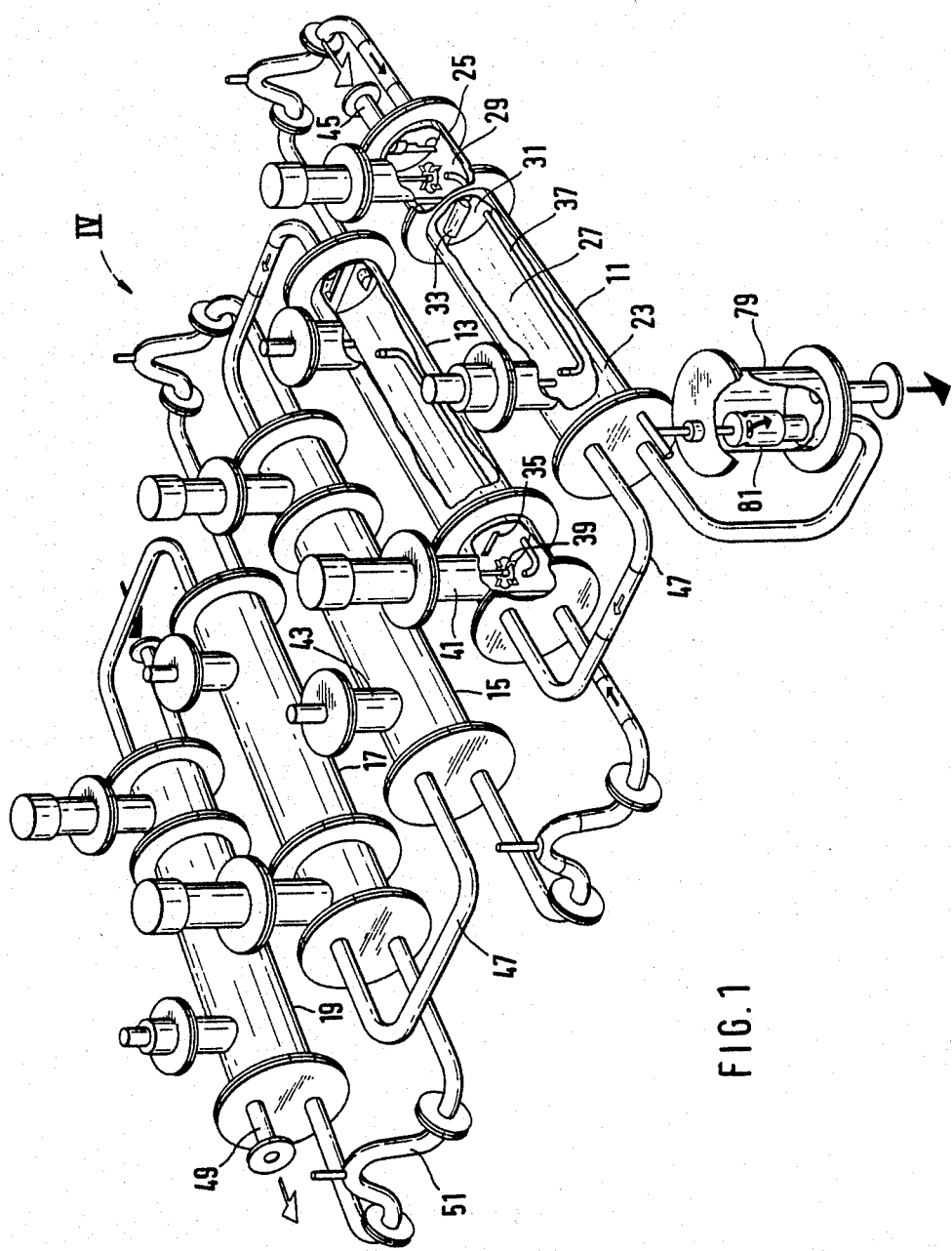
FIG. 1 shows a perspective view of a five-stage tubular mixer-settler.

The tubular mixer-settler shown in FIG. 1 includes five extraction stages constituted by tube portions (11, 13, 15, 17, 19). These tube portions are disposed alongside one another and are mutually parallel and are all in one horizontal plane. The tube portions are of identical configuration. Each two mutually adjacent tube portions have their adjacent ends reversed with respect to each other.

Figure 2:
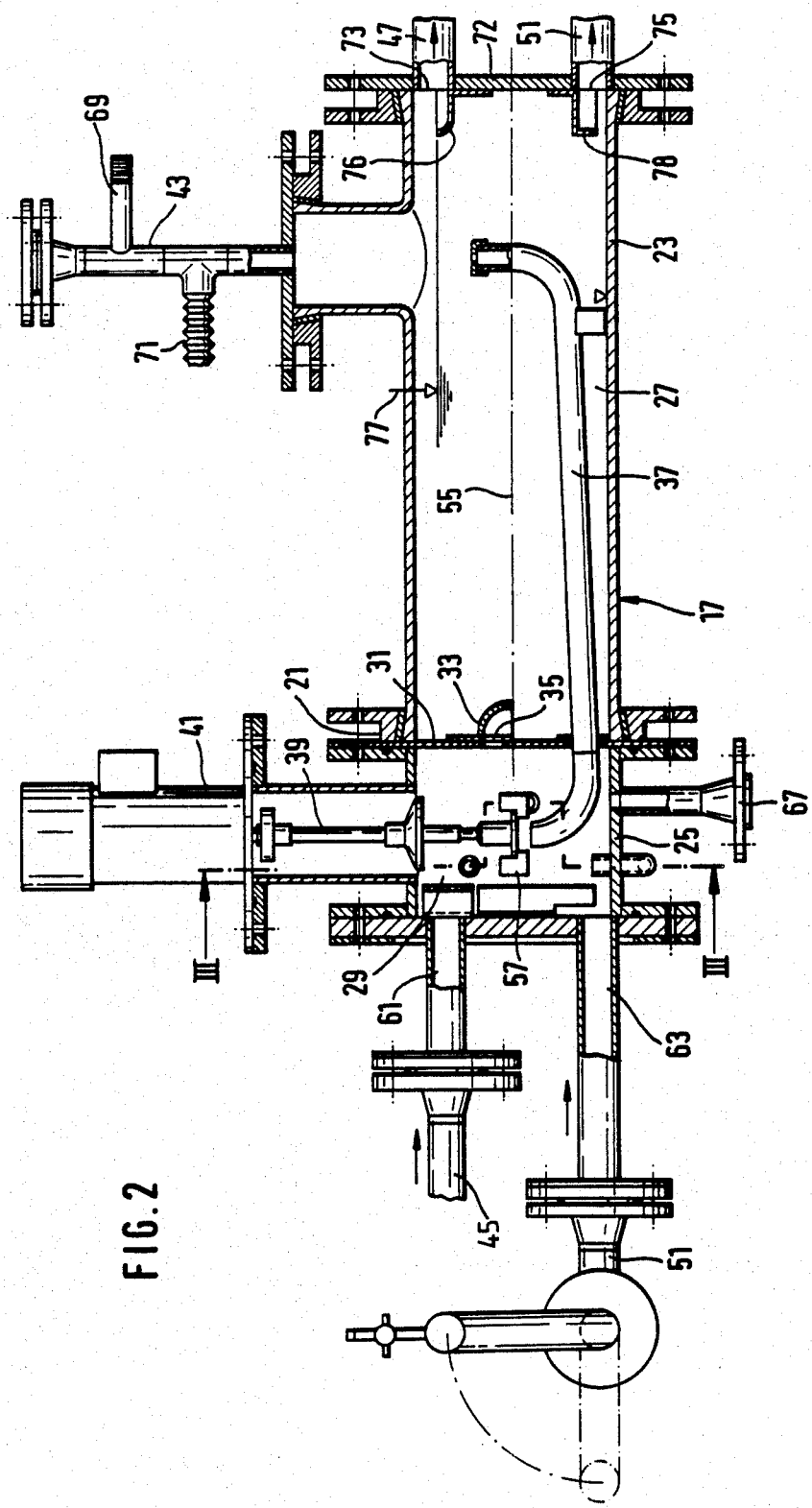
FIG. 2 is a longitudinal section through an extraction stage of the tubular mixer-settler.

Each tube portion consists of two tube lengths 23 and 25 connected to each other by a flanged joint 21 as shown in FIG. 2. The longer tube length 23 forms the settling chamber 27 while the shorter length 25 constitutes the mixing chamber 29. Mixing chamber 29 and settling chamber 27 are separated from each other by a vertical partition wall 31 which is interrupted by a pass-through opening 35 masked by a hood 33.

Mixing and settling chambers (29, 27) are further interconnected by a conduit 37 which passes through the partition wall 31. An agitator is mounted in the mixing chamber 29 and has a drive 41 associated therewith. A measuring and sampling stub 43 is provided in the end zone of each settling chamber 27 on the tube length 23.

The organic washing phase (kerosene) passes through a pipe stub 45 and through the end wall of the first tube portion 11 and into the mixing chamber 29. After its separation, the organic phase is drawn off at the end of the settling chamber 27 through a conduit 47 at the other end and, outside the tube portion 11, the organic phase is fed into the adjacent tube portion 13 and into the mixing chamber 29 thereof in the same way. In this direction, the organic phase flows through the five stages (11, 13, 15, 17, 19) of the tubular mixer-settler and is drawn off through a pipe stub 49 at the end of the last tube portion 19.

The aqueous phase which is to be cleaned is fed to the mixing chamber 29 of the last tube portion 19 and, at the end of the settling chamber 27, it is drawn off through a conduit 51 and, outside the tube portion 19, it is fed into the mixing chamber 29 of the adjacent tube portion 17. In this direction, the aqueous phase flows through the tubular mixer-settler in countercurrent to the organic phase. At the end of the settling chamber 27 of the first tube portion 11, the aqueous phase is drawn off and fed to further processing through a level-setting container 79.

FIG. 2 shows the tube portion 17 of an extraction stage in longitudinal section. The extraction stage includes two pipe lengths 23 and 25 fixed to each other by the flanged connection 21. The longer tube length 23 constitutes the settling chamber 27 and the shorter tube length 25 the mixing chamber 29. Mixing chamber 29 and settling chamber 27 are separated from each other by the vertical partition wall 31 and are connected via the pass-through opening 35 which is masked by the hood 33. This opening 35 is located in the region of the interface 55 of the phases.

Mixing and settling chambers 29, 27 are further interconnected via the conduit 37 which passes through the partition wall 31 and the ends of this conduit are bent vertically upwardly. The end of the conduit 37 which is disposed in the settling chamber 27 is situated above the phase interface 55 in the region of the settling organic phase. The tube end which is in the mixing chamber 29 is covered at a definite spacing by an agitator vane 57 on the agitator 39 which is rotatable by the drive 41. The rotating agitator vane 57 is so configured that it exerts a suction action on the conduit 37.

Figure 3:
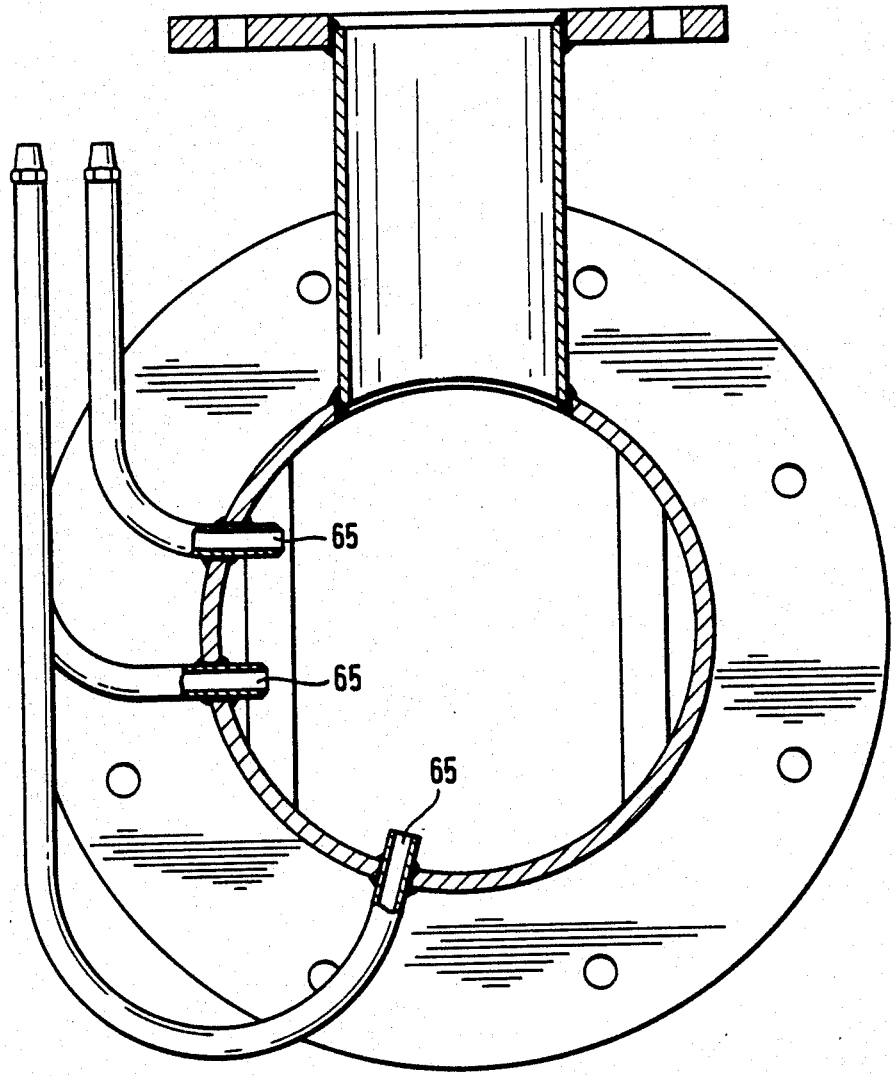
FIG. 3 shows a section taken on the line III—III in FIG. 2 with the agitator omitted; and, FIG. 4 shows as a detail portion of a side view of the tubular mixer-settler.
Figure 4:
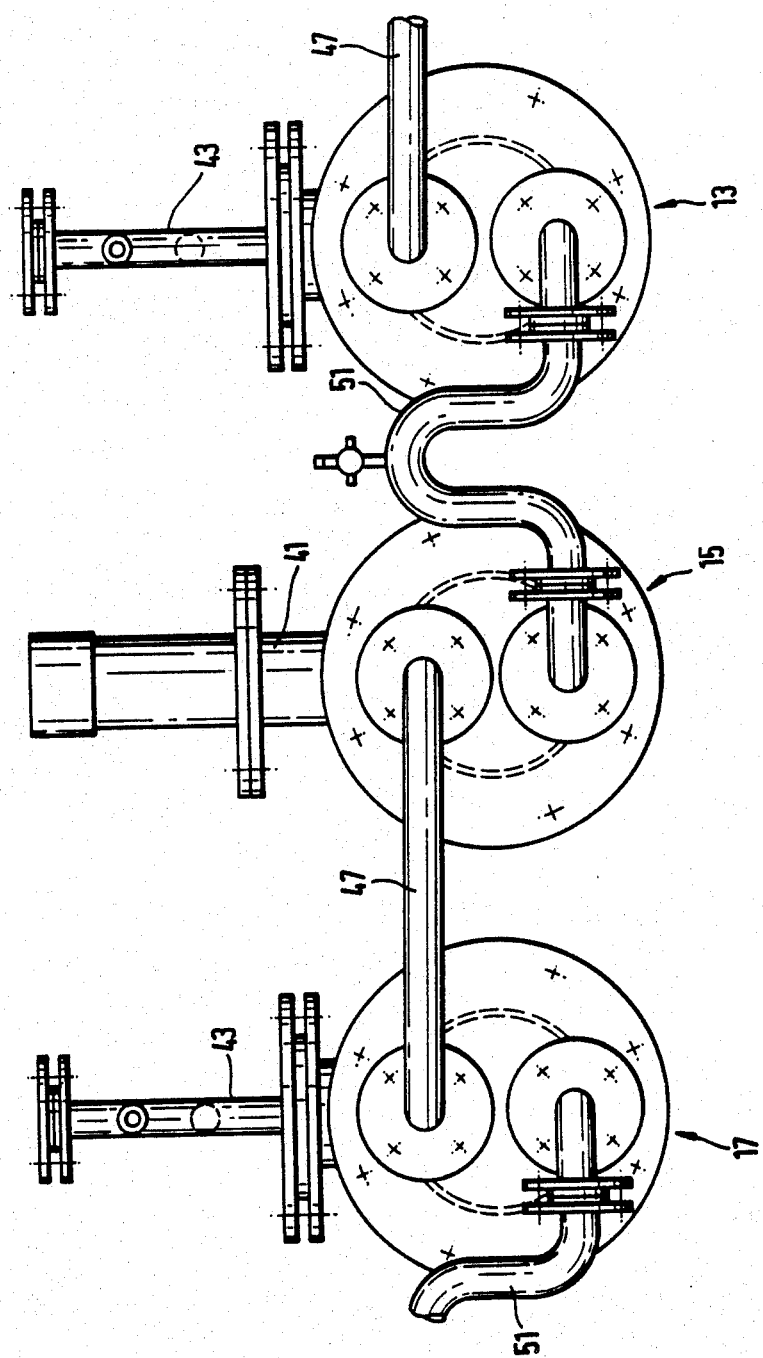

The free end wall of the mixing chamber 29 is penetrated by two feed lines 61 and 63 which supply the organic phase and the aqueous phase. Reference numeral 65 denotes three sampling bores in the mixing chamber (FIG. 3). At the bottom, the mixing chamber is provided with an emptying connector 67 (FIG. 2).

The settling chamber 27 comprises the upper vertical measuring and sampling stubs 43 at which are also located the corresponding lines for venting 69 and overflow 71.

The free end wall 72 of the settling chamber 27 is, on the upper periphery of the settling chamber, provided with an extraction opening 73 for the organic phase. At the lower inner periphery of the settling chamber 27, the end wall 72 is provided with an extraction opening 75 for the aqueous phase. An overflow weir 76 is disposed ahead of the extraction opening 73. The extraction opening 75 is masked by a hood 78 disposed at a predetermined distance therefrom.

The arrow 77 designates the level of liquid which establishes within the settling chamber 27.

The aqueous phase discharge is connected to a level adjusting container 79 (FIG. 1). The interface 55 in the extractor can be adjusted via a vertically adjustable perforated tube 81 in the container 79.

The operation of the above-described apparatus will be described below.

It is intended to clean a Pu-containing aqueous phase of extraction medium residues by using a continuous organic phase (kerosene). The two phases are fed into the mixing chambers 29 at mutually opposite ends of the tubular mixer-settler. The agitators 39 produce a mixture of the phases in the mixing chambers 29. The organic phase is constantly recycled through the conduit 37, that is, it is fed back to the precedent mixing chamber 29.

Sufficient organic phase is always present in the mixing chamber 29 so that a complete and thorough mixing of the phases takes place. By reason of the dimensions of the mixing chamber 29, the choice of cross section of the conduit 37 and the agitator shape and placement, a calculated retention time of the dispersion in the mixing chamber 29 is achieved within an empirically determined range of rotary speeds.

The dispersion passes through the opening 35 into the settling chamber 27 where the settling process takes place. The two separated phases are withdrawn through the connections 73 and 75 and are passed in countercurrent to the adjacent extraction stages or to the discharges.

It is understood that the foregoing description is that of the preferred embodiments of the invention and that various changes and modifications may be made thereto without departing from the spirit and scope of the invention as defined in the appended claims.

What is claimed is:

1. A multi-stage tubular mixer-settler for liquid-liquid countercurrent extraction wherein two phases are mixed, the multi-stage tubular mixture comprising:
    a plurality of mutually adjacent tubular extraction stages arranged in a horizontal plane;
    each of said tubular extraction stages having first and second end walls and including first and second horizontal tubular sections connected together so as to be mutually adjacent and aligned with respect to each other;
    said first tubular section including said first end wall and defining a mixing chamber, said first tubular section including a rotary agitator mounted thereon;
    said second tubular section including said second end wall and defining a settling chamber;
    each of said tubular extraction stages further including: first and second inputs communicating with the mixing chamber thereof for bringing in respective ones of the phases; and, a partition wall having an opening formed therein and arranged between the mixing and settling chambers thereof for separating the latter from each other;
    first conduit means and second conduct means for connecting the settling chamber of each extraction stage with the respective mixing chambers of corresponding ones of the next adjacent extraction stages for obtaining the countercurrent;
    each one of said tubular extraction stages further including a recycling conduit having respective ends in said chambers thereof and passing through said partition wall for conducting one of the phases from the settling chamber of said one stage to the mixing chamber thereof; and,
    each one of said extraction stages having a rotary agitator mounted in said mixing chamber for mixing said phases therein, said rotary agitator being disposed in operative proximity to the end of said recycling conduit in said mixing chamber for also developing a suction force in said recycling conduit to transfer a predetermined quantity of said one phase from said settling chamber to said mixing chamber.

2. The multi-stage tubular mixer-settler of claim 1, said first conduit means and said second conduit means extending outside of the settling chamber and being connected to selected ones of said end walls for communicating with the mixing chamber corresponding to the latter.

3. The multi-stage tubular mixer-settler of claim 1, wherein said phases conjointly define an interface therebetween, said aperture means being formed in said partition wall at the region of said interface.

* * * * *

UNITED STATES PATENT AND TRADEMARK OFFICE
CERTIFICATE OF CORRECTION

PATENT NO. : 4,830,835

DATED : May 16, 1989

INVENTOR(S) : Heinz Evers

It is certified that error appears in the above-identified patent and that said Letters Patent is hereby corrected as shown below:

In column 3, line 48, after "shows" delete "as".

In column 5, line 43: delete "mixture" and substitute -- mixer-settler -- therefor.

Signed and Sealed this

Ninth Day of January, 1990

Attest:

JEFFREY M. SAMUELS

Attesting Officer

Acting Commissioner of Patents and Trademarks